United States Patent [19]

Stepath

[11] 4,273,982
[45] Jun. 16, 1981

[54] UNDERWATER CUTTING AND GOUGING METHOD

[75] Inventor: Myron D. Stepath, Lancaster, Ohio

[73] Assignee: Arcair Company, Lancaster, Ohio

[21] Appl. No.: 687,939

[22] Filed: May 19, 1976

[51] Int. Cl.³ .................. B23K 9/00; B23K 35/10
[52] U.S. Cl. .................................... 219/70; 219/72; 219/145.21
[58] Field of Search .................. 219/68, 69 E, 69 M, 219/70, 72, 74, 75, 121 R, 121 P, 145.21, 121 PC, 121 PH, 121 PY

[56] References Cited

U.S. PATENT DOCUMENTS

| | | | |
|---|---|---|---|
| 3,633,063 | 1/1972 | Ando | 219/145.21 X |
| 3,796,852 | 3/1974 | Vlach | 219/69 E |
| 3,835,288 | 9/1974 | Henderson | 219/70 |
| 3,851,135 | 11/1974 | Moracz et al. | 219/69 E X |
| 3,967,090 | 6/1976 | Hamasaki et al. | 219/70 |
| 4,087,670 | 5/1978 | Miller | 219/72 X |
| 4,131,780 | 12/1978 | Trabbold et al. | 219/70 |

Primary Examiner—Elliot A. Goldberg
Assistant Examiner—Keith E. George
Attorney, Agent, or Firm—James C. Simmons

[57] ABSTRACT

A method for cutting or gouging a metal object submerged in a non-volatile liquid medium by establishing an arc between the consumable electrode and the workpiece to heat and melt the metal and simultaneously directing a stream of the liquid medium at the molten metal to impinge upon and carry the molten metal away from the arc and the workpiece. The inventive method replaces conventional oxy-arc underwater cutting methods.

12 Claims, 5 Drawing Figures

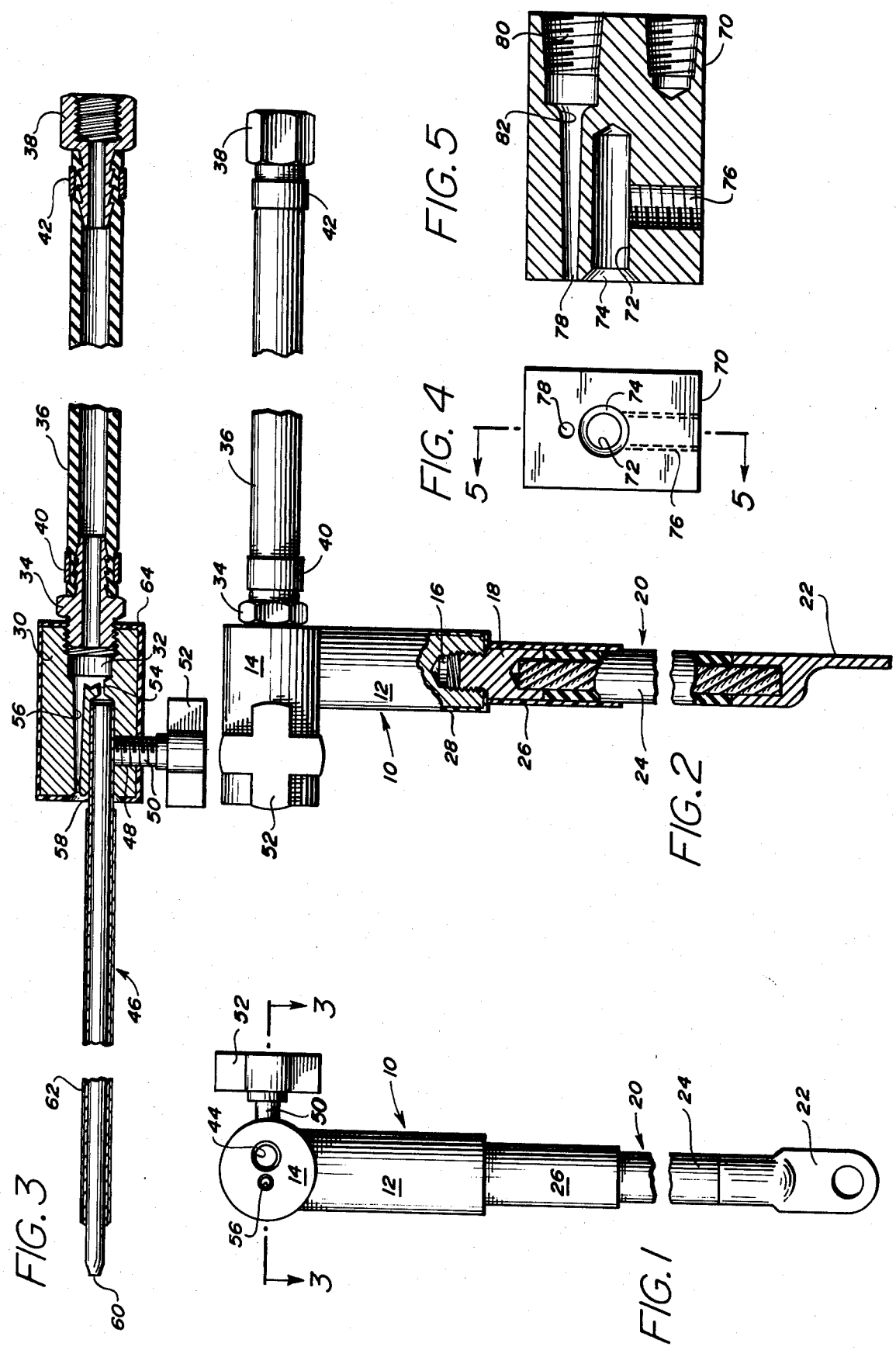

UNDERWATER CUTTING AND GOUGING METHOD

BACKGROUND OF THE INVENTION

This invention pertains to the field of cutting and gouging metals submerged in a non-volatile liquid. The largest field of use of the present invention is in the electric-arc cutting and gouging of metallic objects submerged under large bodies of water such as rivers, lakes, oceans and the like. Such objects can be sunken vessels, submerged portions of floating vessels such as ships, barges and the like, fixed submerged structures such as bridge pilings, coffer dams, piers, or other submerged structural objects. In recent years, electric-arc cutting is being used extensively for the construction and maintenance of offshore oil and gas drilling platforms.

The conventional electric-arc cutting processes used under water are detailed in U.S. Pat. Nos. 2,396,307; 2,417,650; 2,462,463; and 3,751,625. All of these patents disclose in detail underwater cutting torches which employ the well-known oxy-arc process. In the conventional oxy-arc process an electric-arc is struck between a hollow electrode and the workpiece. Simultaneously, oxygen gas is forced down through the center bore of the electrode to provide the chemical reaction in the cutting process. Such processes are limited to through cutting of metals.

In the area of underwater construction and salvage it is sometimes desirable to remove only a portion of the surface of a metallic object in preparation for underwater welding. U.S. Pat. No. 2,706,236 discloses the well-known air-carbon arc cutting and gouging process which for many years has been used on dry land for preparing metal objects for welding. The air-carbon arc cutting and gouging process employs a carbon (graphite) electrode to establish an arc between the electrode and the workpiece to heat and melt the portion workpiece under the arc. Simultaneously, a stream of compressed air is forced down along the electrode to forcibly remove the molten metal from the influence of the arc and from the workpiece thus enabling a skilled operator to gouge the metal for subsequent filler metal welding.

With the conventional oxy-arc process it is not possible to provide for gouging of metallic workpieces submerged in an aqueous environment.

SUMMARY OF THE INVENTION

It has been discovered that the use of oxygen in electric-arc cutting underwater can be eliminated and a process achieved wherein the electric-arc can be used underwater for both cutting and gouging. It has been discovered that the underwater cutting and gouging process is achieved by employing an electrode to strike and maintain an arc between the electrode and the workpiece to heat and melt the workpiece while simultaneously impinging a stream of the liquid medium against the molten metal to remove the molten metal from the influence of the arc and from the workpiece. By controlling the current in the arc and movement of the arc, an operator can cut, groove or gouge a workpiece underwater. In its broadest aspect the invention encompasses electric-arc cutting or gouging in any non-volatile liquid medium wherein the medium can be employed to remove the molten metal from the influence of the arc.

Therefore it is the primary object of the invention to provide a new process for cutting or gouging metallic articles submersed in a non-volatile liquid medium.

It is another object of this invention to provide a new underwater cutting method.

It is still another object of this invention to provide a new underwater gouging method.

It is yet another object of this invention to provide an underwater cutting method not dependent on oxygen or chemical reaction to carry out the cutting process.

It is yet a further object of this invention to provide an improved electric-arc underwater cutting process.

It is still a further object of this invention to provide a new underwater electric-arc cutting and gouging method.

BRIEF DESCRIPTION OF THE DRAWING

FIG. 1 is a front elevational view of an underwater cutting and gouging torch useful in performing the method of the invention.

FIG. 2 is a partial sectional right side elevational view of the torch of FIG. 1.

FIG. 3 is a sectional view taken according to section lines 3—3 of FIG. 1 with the addition of an electrode in section illustrating the method of the invention.

FIG. 4 is a front elevational view of a test torch head used to develop the method of the present invention.

FIG. 5 is a section taken along lines 5—5 of FIG. 4.

DETAILED DESCRIPTION OF THE PREFERRED EMBODIMENT

As set out above, conventional underwater cutting processes have been employed for many years. These processes rely upon the use of a hollow electrode for striking and maintaining an arc between the electrode and the workpiece while simultaneously introducing oxygen to the arc through the hollow electrode. The oxygen is required for chemical reaction in the cutting process.

As set out above, the air-carbon arc cutting and gouging process has been employed for many years in non-aqueous environments for preparing metal objects for welding. The air-carbon arc process has also been used for complete cutting of metallic objects as well as for removing portions of metal objects such as studs, bolts, gussett plates, rivets and the like.

The conventional underwater cutting processes require a source of oxygen which is usually conducted to the torch via a hose from an oxygen bottle on the diving support boat commonly referred to as a tender. With the use of oxygen, the safety hazards increase as well as the opportunity for hoses to become fouled, kinked or severed as they extend for long distances from the surface to the point of use underwater.

The present invention employs a process similar to the air-carbon arc cutting and gouging process except that the process relies upon the liquid environment (e.g. water) as the means for removing the molten metal from the influence of the arc and from the workpiece thus enabling a skilled operator to make a groove or gouge or to completely cut through a metallic object submerged in the environment. If the fluid environment is water or some other non-volatile fluid, a submersible pump can be used to provide the fluid stream thus obviating the need for long support hoses from a remote source of fluid under pressure. Alternatively, fluid can be supplied by a conventional fluid pump maintained on the diving tender.

Referring to the drawing, there is shown in FIG. 1 a prototype torch divised to test the method of the present invention. Other torches have been devised and are the subject matter of copending U.S. patent application Ser. No. 687,940, filed May 19, 1976, and owned by the assignee of the present invention.

The torch 10 of FIG. 1 includes a handle 12 and a head 14. The handle portion 12 was fabricated from a single piece of conductive metal fabricated from a conventional copper alloy used for underwater torches. The handle 12 includes a threaded portion 16 for receiving power cable adapter 18 having a complimentary threaded portion. The power cable adapter 18 is in turn connected to a main power cable 20 which in turn is connected to a suitable power supply (now shown) by a power supply lug or connector 22. The entire power cable 20 is covered by an insulating coating 24 as is well-known in the art. An insulating boot 26 covers cable adapter 18 and assures a fluid tight seal between the cable adapter 18 and torch handle 12. Torch handle 12 has an insulating coating 28 so that the torch can carry a current and be safely gripped by an operator.

As shown in FIG. 3, the torch head 14 includes the head block 30 fabricated from a copper-based metal alloy having therein a first counter bored portion 32 the larger diameter portion being threaded to receive hose adapter 34. Hose adapter 34 has a barbed portion for receiving a fluid conduit 36 which extends for a suitable length and terminates with a conventional hose connector 38 with suitable means, e.g. threads, for affixing connector 38 to a fluid pressure source such as a pump. Conduit or hose 36 is fastened to adapters 34 and 38 respectively as by conventional hose clamps 40 and 42.

Disposed within head block 30 is a recess 44 of suitable shape to receive an electrode shown generally as 46. Communicating with recess 44 is a threaded port 48 which has disposed therein a stem 50 and knob 52. The stem 50 can move into a recess 44 thus exerting a positive gripping force on electrode 46. A small passage 54 communicates with counter bore 32 so that fluid pressure can be employed to eject the stub of the electrode after it is partially consumed.

Adjacent to and having a center line generally parallel to recess 44 is a tapered passage 56. Tapered passage 56 begins at counter bore 32 and ends on the face of head block 30 adjacent to recess 44 as is shown in FIG. 1.

Electrode 46 includes a first thin coating of a metal 58 such as copper, the entire surface except the tapered tip 60 of electrode 46 being coated with the copper layer. Disposed over the copper layer 58 is an insulating layer 62 extending for a substantial length along the portion of the electrode projecting from head block 30.

The preferred electrode for the process is a direct current (DC) electrode which is normally used for the air-carbon arc cutting and gouging process. Such electrodes are available from the Arcair Company, Lancaster, Ohio, National Carbon Division of Union Carbide and Airco-Speer Carbon and Graphite Division of Airco, Inc. The graphite electrode is provided with a thin coating of a conductive metal, e.g. copper, as is well known in the art. For the process of the instant invention, it is necessary to provide an electrically insulating coating on those portions of the electrode except for the tip, that are exposed to the diver and the surrounding environment. After considerable testing, a coating such as disclosed in U.S. Pat. No. 3,835,288, the specification of which is incorporated here by reference, was found to be satisfactory. In particular, an epoxy resin such as sold by Michigan Chrome and Chemical Company under the trade designation MICCRONTYPE 650 epoxy is idealy suited as a coating.

As with handle 12, head block 30 has an insulating coating 64 to prevent shock should the user touch the head 14 while the torch is being used.

In use, conduit 36 is connected to a source of fluid under pressure. If the diver is working in a large pool of water such as a lake, fitting 38 can be connected to a submersible pump which is maintained near the site of torch operation. Connector 22 of conduit 20, is fastened to a welding power supply as is well known in the art.

A graphite electrode such as commonly employed in the air-carbon arc cutting and gouging process having first been provided with an insulating coating 62 is placed in recess 44.

The diver then strikes an arc between point 60 of electrode 46 and the workpiece (not shown) to initiating heating and melting of the underlying metal. After the arc is struck, fluid is forced through conduit 36 and out through tapered passage 56 toward the arc. As the arc produces melting of the molten metal, the stream of fluid under pressure forces the molten metal away from the arc and off of the workpiece thus enabling an operator to either perform a gouging operation on the workpiece or a complete cut through the workpiece.

In addition to the conventional round electrode such as shown in FIG. 3, a conventional flat electrode such as disclosed in U.S. Pat. No. 3,566,069, was used for testing the method of the instant invention. The flat electrode was also provided with an insulating coating such as used with the round electrodes. Of course when using the flat electrodes, the configuration of aperture 44 in torch head 14 had to be modified to accomodate the flat electrodes which have a cross-sectional shape similar to a rectangle with semi-circular ends.

A large number of tests were run in a diving tank containing fresh water wherein workpieces could be supported for trials at a depth of eight feet. Using a torch such as shown in the drawing in combination with various welding power supplies, diving tank tests were conducted and data recorded. The power supplies included a Model SR600 DC power supply manufactured by the Miller Electric Company of Appleton, Wis., a Model LSR-1400 liquid carbonic DC arc welder manufactured by Liquid Carbonic Division of Chemetron Corporation and a SEAPACK-350 diesel engine DC power source sold by the Arcair Company. In addition, various tests were run using both a surface pump sold as hypro series 5300 piston pump powered by a Dayton Model 4K783-D motor, the combination which is sold by Sand M Pump Company, Houston, Tex. and an Aqua-sub model 12D 5A type 70 submersible pump offered for sale by TRW, Inc.

On the basis of the tests accomplished, it was discovered that when the power source setting was maintained between 80 and 100% of the duty cycle and the water pressure was between 80 and 100 psi above the ambient pressure surrounding the submerged article effective cutting and gouging can take place. As with the conventional hand-operated air-carbon arc cutting and gouging process, the operator can influence the quality of the gouge; however, even an inexperienced operator can make gouges or completely cut through a submerged article.

Set forth in Table 1 below are a series of tests which were run to verify the inventive process.

TABLE I

| Test No. | Metal Plate Material | Process (a) | Electrode Size & Type (b) | Power Source (c) | Arc Parameters Volts | Arc Parameters Amps | Arc Time (Mins.) | Grams Carbon Used | Inches Carbon Used | Lbs. Metal Removed |
|---|---|---|---|---|---|---|---|---|---|---|
| 1RD2-1 | ½" Mild Steel | G | 5/16" × 9" | Miller | 40 | 450 | .45 | 4.5 | 1.6 | .14 |
| 1RD2-2 | ½" Mild Steel | C | 5/16" × 9" | Miller | 30 | 600 | .75 | 7.15 | 2.59 | .23 |
| 1RD2-3 | 1" Mild Steel | G | ⅜" × 9" | Miller | 40 | 468 | .80 | 8.9 | 2.32 | .52 |
| 1RD2-4 | ½" Mild Steel | C | ⅜" × 9" | Miller | 27 | 710 | .80 | 13.8 | 3.47 | .41 |
| 1RD2-5 | ⅞" Mild Steel | C | ⅜" × 9" | Miller | 30 | 700 | .40 | 6.35 | 1.65 | .22 |
| 1RD2-6 | 1" Mild Steel | G | ½" × 9" | Miller | 35 | 526 | 1.10 | 7.0 | 1.11 | .54 |
| 1RD2-7 | ½" Mild Steel | C | ½" × 9" | Miller | 30 | 698 | .70 | 6.9 | 1.07 | .50 |
| 1RD2-8 | ⅞" Mild Steel | C | ½" × 9" | Miller | 28 | 713 | .40 | 3.75 | .58 | .16 |
| 1RD3-1 | ½" Mild Steel | FG | ⅝" flat × 9" | L.C. | 30 | 623 | .2 | 4.9 | 1.13 | .04 |
| 1RD3-2 | ¼" Mild Steel | S | ⅝" flat × 9" | L.C. | 55 | 338 | .8 | 13.9 | 3.25 | .12 |
| 1RD3-3 | 1" Mild Steel | FG | ⅝" flat × 9" | L.C. | 45 | 450 | .35 | 5.2 | 1.4 | .14 |
| 1RD3-4 | ¼" Mild Steel | S | ⅝" flat × 9" | L.C. | 50 | 375 | .5 | 7.55 | 1.75 | .14 |
| 1RD4-1 | ⅜" Mild Steel | G@20psi | 5/16" × 9" | L.C. | 36 | 512 | .6 | 2.8 | 1.0 | .01 |
| 1RD4-2 | ⅜" Mild Steel | G@40psi | 5/16" × 9" | L.C. | 34 | 526 | .7 | 4.5 | 1.5 | .06 |
| 1RD4-3 | ⅜" Mild Steel | G@60psi | 5/16" × 9" | L.C. | 37 | 488 | .7 | 4.8 | 1.5 | .17 |
| 1RD4-4 | ⅜" Mild Steel | G@80psi | 5/16" × 9" | L.C. | 33 | 576 | .45 | 3.55 | 1.25 | .15 |
| 1RD4-5 | ⅜" Mild Steel | G@95psi | 5/16" × 9" | L.C. | 35 | 518 | .5 | 2.8 | 1.0 | .13 |
| 1RD4-6 | ⅜" Mild Steel | G@120psi | 5/16" × 9" | L.C. | 39 | 475 | .65 | 3.0 | 1.0 | .15 |
| 1RD5-1 | ⅜" Mild Steel | G | 5/16" × 9" | L.C. | 35 | 500 | .3 | 2.05 | 1.0 | .054 |
| 1RD5-2 | ⅜" Mild Steel | C | 5/16" × 9" | L.C. | 32 | 520 | .35 | 6.35 | 2.0 | .021 |
| 1RD5-3 | Lap Joint ⅜" Fillet Weld | R | 5/16" × 9" | L.C. | 34 | 512 | .25 | 1.4 | .5 | .10 |
| 1RD5-4 | ⅜" Mild Steel | G | 5/16" × 9" | L.C. | 30 | 580 | .45 | 2.3 | 1.125 | .14 |
| 1RD5-5 | ⅜" Mild Steel | C | 5/16" × 9" | L.C. | 31 | 563 | .65 | 4.55 | 1.5 | .17 |
| 1RD5-6 | Lap Joint ⅜" | R | 5/16" × 9" | L.C. | 34 | 512 | .55 | 1.85 | .875 | .14 |
| 1RD6-1 | ⅜" Mild Steel | g@7'8" | 5/16" × 9" | Miller | 55 | 308 | .3 | 4.11 | 1.125 | .142 |
| 1RD6-2 | ⅜" Mild Steel | g@6'8" | 5/16" × 9" | Miller | 50 | 338 | .35 | 3.03 | 1.0 | .138 |
| 1RD6-3 | ⅜" Mild Steel | g@5'8" | 5/16" × 9" | Miller | 45 | 375 | .3 | 3.46 | 1.125 | .174 |
| 1RD6-4 | ⅜" Mild Steel | g@4'8" | 5/16" × 9" | Miller | 48 | 360 | .35 | 2.69 | .969 | .155 |
| 1RD6-5 | ⅜" Mild Steel | g@3'8" | 5/16" × 9" | Miller | — | — | .3 | 3.21 | 1.063 | .173 |
| 1RD6-6 | ⅜" Mild Steel | g@2'8" | 5/16" × 9" | Miller | — | — | .3 | 3.29 | 1.125 | .165 |
| 1RD6-7 | ⅜" Mild Steel | g@1'8" | 5/16" × 9" | Miller | — | — | .3 | 3.42 | 1.063 | .148 |
| 2RD4-1 | Bolt Weld on ½" Plate | R | 5/16" × 8'6" | Miller | 29 | 473 | .4 | 2.1 | .766 | .1 |
| 2RD4-2 | Pipe Weld on ½" Plate | R | 5/16" × 8'6" | Miller | 32 | 563 | .4 | 5.5 | 1.848 | .2 |
| 2RD4-3 | T-Joint Weld ⅜" Plate | R | 5/16" × 8'6" | Miller | 27 | 538 | .4 | 4.1 | 1.417 | .17 |
| 2RD4-4 | Simulated Crack ½" | G | 5/16" × 8'6" | Miller | 29 | 361 | .3 | 1.3 | .474 | .06 |
| 2RD4-5 | Circle From ⅜" | C | 5/16" × 8'6" | Miller | 22 | 616 | .8 | 10.5 | 3.643 | .27 |
| 2RD4-6 | Circle From ⅜" | C | 5/16" × 8'6" | Miller | 38 | 458 | 1.6 | 20.9 | 7.455 | .51 |
| 2RD4-7 | Scarfing ¼" Plate | S | A⅜" Flat × 8½" | Miller | 33 | 579 | 2.9 | 57.6 | 15.548 | .52 |
| 2RD4-8 | T-Joint Weld ⅜" Plate | R | A⅜" Flat × 8½" | Miller | 26 | 639 | .4 | 9.7 | 2.776 | .10 |
| 2RD5-1 | ¼" Mild Steel | G | 5/16" × 8½" | Miller | — | 400 | .5 | 4.5 | 1.5 | .2 |
| 2RD5-2 | ¼" Mild Steel | G | 5/16" × 8½" | Miller | — | 420 | .4 | 5.2 | 1.7 | .2 |
| 2RD5-3 | ¼" Mild Steel | G | 5/16" × 8½" | Miller | — | 560 | .4 | 8.6 | 2.9 | .09 |
| 2RD5-4 | ¼" Mild Steel | G | 5/16" × 8½" | Miller | — | 540 | .4 | 7.4 | 2.5 | .09 |
| 2RD6-1 | ¼" Mild Steel | G | 5/16" × 9" | L.C. | — | 480 | .5 | 5.9 | 2.08 | .295 |
| 2RD6-2 | ¼" Mild Steel | G | 5/16" × 9" | L.C. | — | 440 | .5 | 6.3 | 2.16 | .250 |
| 2RD6-3 | ¼" Mild Steel | C | 5/16" × 9" | L.C. | — | 630 | .9 | 14.6 | 4.98 | .310 |
| 2RD6-4 | ¼" Mild Steel | C | 5/16" × 9" | L.C. | — | 640 | 1.2 | 17.0 | 5.98 | .625 |
| 2RD7-1 | ¼" Mild Steel | G | 5/16" × 9" | L.C. | — | 600 | .4 | 8.9 | 2.87 | .30 |
| 2RD7-2 | ¼" Mild Steel | C | 5/16" × 9" | L.C. | — | 610 | .8 | 9.5 | 3.39 | .30 |
| 2RD7-3 | ¼" Mild Steel | G | 5/16" × 9" | L.C. | — | 600 | .3 | 4.7 | 1.71 | .18 |
| 2RD7-4 | ¼" Mild Steel | C | 5/16" × 9" | L.C. | — | 620 | .7 | 12.7 | 4.40 | .32 |
| 1RD1-1 | ⅜" Mild Steel | G | 5/16" × 9" | Arcair | 40 | 385 | .4 | 3.5 | 1.0 | .17 |
| 1RD1-2 | ⅜" Mild Steel | C | 5/16" × 9" | Arcair | 25 | 472 | .8 | 10.4 | 3.0 | .13 |
| 1RD1-3 | ⅜" Mild Steel | C | 5/16" × 9" | Arcair | 23 | 486 | .9 | 15.35 | 4.5 | .12 |
| 1RD1-4 | Lap Weld ⅜" Plate | C | 5/16" × 9" | Arcair | 28 | 463 | .3 | 5.65 | 1.75 | .32 |
| 1RD1-5 | ⅜" Mild Steel | G | ⅜" × 9" | Arcair | 34 | 418 | .3 | 2.2 | .5 | .10 |
| 1RD1-6 | ⅜" Mild Steel | C | ⅜" × 9" | Arcair | 25 | 450 | 1.35 | 9.7 | 2.38 | .17 |
| 2RD2-1 | Zig-Zag Tacked | G | 5/16" × 8½" | L.C. | 40 | 340 | .2 | 2.4 | .8 | .145 |
| 2RD2-2 | Mild Steel | G | 5/16" × 8½" | L.C. | 40 | 460 | .5 | 6.6 | 2.2 | .25 |
| 2RD2-3 | Mild Steel | C | 5/16" × 8½" | L.C. | 30 | 570 | 1.05 | 10.9 | 3.7 | .25 |
| 2RD2-4 | T-Joint | R | 5/16" × 8½" | L.C. | 32 | 510 | .87 | 7.8 | 2.6 | .25 |
| 2RD2-5 | Zig-Zag Tacked | G | 5/16" × 8½" | L.C. | 38 | 400 | .18 | 2.9 | 1.0 | .14 |
| 2RD2-6 | Mild Steel | G | 5/16" × 8½" | L.C. | 40 | 420 | .55 | 6.8 | 2.3 | .25 |
| 2RD2-7 | Mild Steel | C | 5/16" × 8½" | L.C. | 30 | 580 | .89 | 17.5 | 5.9 | .27 |
| 2RD2-8 | T-Joint | R | 5/16" × 8½" | L.C. | 32 | 550 | .66 | 7.2 | 2.4 | .195 |
| 2RD2-9 | Mild Steel | G | 5/16" × 9½" | L.C. | 46 | 400 | .45 | 5.7 | 1.9 | .19 |
| 2RD2-10 | Mild Steel | G | 5/16" × 9" | L.C. | 46 | 410 | .65 | 6.9 | 2.4 | .33 |
| 2RD2-11 | Mild Steel | G | 5/16" × 8½" | L.C. | 50 | 400 | .57 | 7.2 | 2.4 | .33 |
| 2RD2-12 | Mild Steel | G | 5/16" × 8" | L.C. | 44 | 410 | .61 | 6.5 | 2.1 | .26 |
| 2RD2-13 | Mild Steel | G | 5/16" × 7½" | L.C. | 44 | 370 | .62 | 7.5 | 2.6 | .395 |
| 2RD2-14 | Mild Steel | G | 5/16" × 7" | L.C. | 42 | 405 | — | 7.0 | 2.5 | .345 |

TABLE I-continued

| Test No. | Metal Plate Material | Process (a) | Electrode Size & Type (b) | Power Source (c) | Arc Parameters Volts | Arc Parameters Amps | Arc Time (Mins.) | Grams Carbon Used | Inches Carbon Used | Lbs. Metal Removed |
|---|---|---|---|---|---|---|---|---|---|---|
| 2RD2-15 | Mild Steel | G | A5/16" × 8¼" | L.C. | 40 | 420 | — | 5.7 | 1.9 | .175 |
| 2RD2-16 | Mild Steel | G | A5/16" × 8¼" | L.C. | 46 | 440 | .63 | 7.9 | 2.7 | .31 |
| 2RD3-1 | ¼" Mild Steel | S | A⅜" Flat × 8½" | L.C. | 40 | 400 | .4 | 4.5 | 1.2 | .07 |
| 2RD3-2 | ¼" Mild Steel | S | A⅜" Flat × 8½" | L.C. | 36 | 475 | .7 | 8.5 | 2.4 | .162 |
| 2RD3-3 | ¼" Mild Steel | S | A⅜" Flat × 12" | L.C. | 35 | 500 | 1.1 | 7.3 | 2.0 | .065 |
| 2RD3-4 | ¼" Mild Steel | S | A⅜" Flat × 9" | L.C. | 35 | 500 | .5 | 8.2 | 2.2 | .075 |
| 2RD3-5 | ¼" Mild Steel | S | A⅜" Flat × 8" | L.C. | 39 | 450 | .3 | — | — | .057 |
| 2RD3-6 | ¼" Mild Steel | S | A⅜" Flat × 7" | L.C. | 40 | 500 | .4 | 4.2 | 1.2 | — |
| 2RD3-7 | ¼" Mild Steel | G | 5/16" × 8¼" | L.C. | 42 | 390 | — | 6.0 | 2.2 | .342 |
| 2RD3-8 | ¼" Mild Steel | C | 5/16" × 8¼" | L.C. | 30 | 590 | .5 | 7.3 | 2.5 | .250 |
| 2RD3-9 | ¼" Mild Steel | G | 5/16" × 8¼" | L.C. | 45 | 515 | .55 | 7.3 | 5.5 | .244 |
| 2RD3-10 | ¼" Mild Steel | C | 5/16" × 8¼" | L.C. | 30 | 590 | .75 | 13.8 | 4.7 | .148 |
| 92RD7-1 | T-Joint Weld (1") | R | 5/16" × 12" | Miller | 45 | 560 | .75 | — | 4.0 | .48 est. |
| 92RD7-2 | T-Joint Weld (1") | R | 5/16" × 9¼" | Miller | 51 | 520 | .6 | — | 2.62 | .35 est. |
| 92RD7-3 | T-Joint West (1") | R | 5/16" × 8¼" | Miller | 51 | 480 | .3 | — | — | .16 est. |
| 92RD8-1 | T-Joint Weld (½") | R | 5/16" × 12" | Miller | 34 | 450 | .85 | — | 3.25 | .31 est. |
| 92RD8-2 | T-Joint Weld (½") | R | 5/16" × 12" | Miller | 40 | 370 | .65 | — | 2.0 | .26 est. |
| 92RD8-3 | T-Joint Weld (½") | R | 5/16" × 9¼" | Miller | 38 | 450 | .69 | — | 2.25 | .29 est. |
| 92RD8-4 | T-Joint Weld (½") | R | 5/16" × 8¼" | Miller | 38 | 400 | .81 | — | 2.06 | .36 est. |
| 92RD8-5 | T-Joint Weld (½") | R | 5/16" × 7½" | Miller | 45 | 370 | .75 | — | 2.88 | .36 est. |
| 92RD8-6 | ¾" Mild Steel | G | 5/16" × 12" | Miller | 41 | 340 | 3.0 | — | 6.81 | .91 |
| 92RD8-7 | ¾" Mild Steel | G | 5/16" × 12" | Miller | 43 | 330 | 1.15 | — | 3.0 | .36 |
| 92RD8-8 | ¾" Mild Steel | G | 5/16" × 9½ | Miller | 44 | 310 | 1.25 | — | 2.75 | .36 |
| 92RD8-9 | ¾" Mild Steel | G | 5/16" × 80½" | Miller | 45 | 295 | 1.15 | — | 2.63 | .42 |
| 92RD8-10 | ¾" Mild Steel | G | 5/16" × 7½" | Miller | 44 | 300 | 1.35 | — | 3.13 | .46 |
| 92RD8-11 | ¾" Mild Steel | C | 5/16" × 12" | Miller | 32 | 450 | 1.59 | — | 2.25 | .26 |
| 92RD8-12 | ¾" Mild Steel | C | A5/16" × 12" | Miller | 20 | 480 | 1.36 | — | 5.75 | .19 |
| 92RD8-13 | ¾" Mild Steel | C | A¼" × 12" | Miller | 29 | 380 | 1.19 | — | 6.75 | .20 |
| 92RD8-14 | ¾" Mild Steel | C | A¼" AC × 12" | SP-60% | — | 480 | .56 | — | — | — |
| 92RD8-15 | ¾" Mild Steel | C | A¼" AC × 12" | SP-60% | 27 | 433 | 2.0 | — | — | — |
| 92RD8-16 | ¾" Mild Steel | C | A5/16" AC × 12" | SP-60% | 27 | 500 | 1.09 | — | — | — |
| 2RD1-1 | ¼" Mild Steel | G | A5/16" AC × 8¼" | L.C. | 45 | 350 | — | 4.5 | 1.35 | .15 |
| 2RD1-2 | ¼" Mild Steel | G | A5/16" AC × 8¼" | L.C. | 50 | 425 | — | 4.9 | 1.51 | .18 |
| 2RD1-3 | ¼" Mild Steel | G | A5/16" AC × 8¼" | L.C. | 45 | 400 | — | 5.9 | 1.82 | .17 |
| 2RD1-4 | ¼" Mild Steel | G | A5/16" AC × 8¼" | L.C. | 45 | 425 | — | 4.1 | 1.22 | .15 |
| 2RD1-5 | ¼" Mild Steel | G | A5/16" AC × 8¼" | L.C. | 45 | 400 | — | 3.0 | 0.91 | .14 |
| 2RD1-6 | ¼" Mild Steel | G | A5/16" AC × 8¼" | L.C. | 45 | 400 | — | 3.7 | 1.13 | .14 |
| 2RD1-7 | ¼" Mild Steel | G | A5/16" AC × 8¼" | L.C. | 45 | 400 | — | 3.9 | 1.18 | .13 |
| 2RD1-8 | ¼" Mild Steel | G | A5/16" AC × 8¼" | L.C. | 45 | 425 | — | 3.9 | 1.19 | .16 |

(a) R = Weld removal, G = gouging, C = cutting, S = scarfing, FG = flat gouging
(b) Electrodes are copper coated D.C. electrodes produced by National Carbon Division of Union Carbide Corporation except where noted. A = Arcair (All electrodes epoxy coated over copper)
(c) 600 Miller Power Source Settings on 80% of max. Range, 400 Liquid Carbon Settings on 100% of max. range From the foregoing it is obvious that the method of the instant invention can be used to provide weld removal, gouging, cutting, scarfing, or flat gouging operations underwater. Such operations have heretofore been unavailable to the underwater salvage operator. Furthermore, from the evidence present in the foregoing table, it is obvious that various electrode sizes can be used and that there is good utilization of the electrode per amount of metal removed.

As indicated above, those tests run in the shallow tank were run at a depth of about 18", whereas those tests run in the deep tank were run at eight feet thus showing that the inventive process can work at depth. In addition, a prototype torch was sent out to field and was found to work in ambient conditions in the Gulf of Mexico. In the field trials, various thicknesses of steel plate ranging from 3/32 of an inch of thickness to ¾ of an inch in thickness were cut using a standard power supply with a welding current of between 500 and 600 amps and a water pressure in the torch of 140 psi. Cutting was as follows:

| Plate Thickness | Inches Per Minute |
|---|---|
| 3/32" | 50 |
| 3/16" | 24 |
| ¼" | 18 |
| ¾" | 1.4 |

In addition, 32" diameter steel pipe having a ¾" wall thickness was completely severed. Another test performed a gouge 1½" wide ¾" deep in a steel pipeline 12' long. The method of the instant invention was found applicable to cutting brass, aluminum and a proprietary corrosion resistant alloy of the field trial company. Lastly, 1" diameter steel wire rope could be cut completely through in 10 seconds during the test.

During the development of the invention, various configurations for the fluid passage 56 were tried. The one shown in FIG. 3 where the longitudinal axis of passage 56 is offset from the longitudinal axis of counter bore 32 was found to be satisfactory.

There is shown in FIG. 4 and FIG. 5 a preferred nozzle configuration, the figures illustrating a test block used to verify the nozzle configuration. The test block (head) 70 of FIG. 4 is fabricated from an alloy similar to the alloy used for the head 14 of the torch of FIGS. 1-3. Block 70 includes a first recess 72 for receiving the below, tests 1 and 2 were conducted using the standard oxy-arc cutting technique. Tests 3, 4 and 5 were run with the method of the present invention.

TABLE III
METAL REMOVAL TEST DATA

| Test | Weight of Elect. (a) | Amp. | Volt | Length of Electrode Used (inches) | Lbs. of Metal Removed | Total Arc Time (Mins.) | Lbs. Per Min. Arc Time | Lbs. Per Elect. | Arc Mins. Per Electrode | Length & Width of cut Per Electrode |
|---|---|---|---|---|---|---|---|---|---|---|
| 1. | 125.1g | 483 | 36 | 10.75" | 0.51 | 0.6 | .85 | .52 | .61 | 13.05" × ⅜" |
| 2. | 123.3g | 503 | 33 | 10.5" | 0.51 | 0.6 | .85 | .53 | .63 | 10.48" × ⅜" |
| 1 & 2 | | 493 | 35 | 21.25" | 1.02 | 1.2 | .85 | .53 | .62 | 11.78" × ⅜" |
| 3(b) | approx. 22.0g | 556 | 28 | 22.47" | 1.555 | 4.7 | .331 | .415 | .80 | 7.97" 1 × ⅜" w/Electrode |
| 4(c) | approx. 22.0g | 510 | 30 | 6.281" | 0.89 | 1.75 | .509 | .850 | .60 | 7.97" 1 × ⅜" w/Electrode |
| 5(d) | approx. 22.0g | 447 | 40 | 53.21g | 2.42 | 5.75 | .421 | .802 | .52 | 7.97" 1 × ⅜" w/Electrode |

Notes:
(a) All electrodes 5/16" diameter - Test Material ½" Thick Mild Steel Plate
(b) Average of 6 trials using method of invention to cut through plate
(c) Average of 5 trials using method of invention to remove lap welded plate
(d) Average of 15 trials using method of invention to groove plate electrode. The outer end of recess 72 contains a tapered opening 74 to facilitate entry and removal of electrodes. Head 70 also includes a threaded passage 76 which receives a threaded stud (not shown) to secure the electrode within the recess 72. Adjacent to the recess 72 is a tapered passage 78 which communicates with a threaded bore 80 to receive the fluid hose (not shown). Passage 78 was found to provide the best gouging characteristics when it was 1⅜" long, having a large diameter of 0.1224", a small diameter of 0.1137" and a maximum radius of 0.020" at the transition 82 between the passage 78 and the bore 80. Of course the possibility of establishing other passage configurations is unlimited, and the invention in its broadest sense is not limited to a passage having the foregoing configurations.

Set forth in Table II is a comparison summary of results using the orifice of FIGS. 4 and 5 which is denoted as radius and centered in comparison to the standard orifice (FIG. 3).

It is obvious from the foregoing that, not withstanding the short or useable length (6" versus 11") the graphite electrode removes 60 and 51% respectively more metal when removing welds and grooving than did the conventional oxy-arc electrode. When reviewing the table, the oxy-arc process appears to be faster when comparing the pounds per minute of arc time between the two processes. However, when the arc minutes per electrode parameter is considered, the method of the invention in regard to weld removal and grooving is much more efficient.

While the oxy-arc process may have an advantage in cutting operations, the process of the instant invention enables the underwater salvage operator to perform weld removal, grooving, and gouging operations heretofore not possible with an oxy-arc torch.

The process of the instant invention is also useable for cleaning surface scale and removing barnacles from submerged objects.

TABLE II
SUMMARY OF TABLE I RESULTS

| ITEM | NO. | TORCH ORIFICE | VOLTS | AMPS | ARC TIME (MINS.) | GRAMS CARBON USED | INCHES OF CARBON USED | LBS. METAL REMOVED |
|---|---|---|---|---|---|---|---|---|
| GROOVING | 15 | Radius & Centered | 40 | 447 | 5.75 | 53.21 | 18.110 | 2.42 |
| WELD REMOVAL | 5 | Standard | 30 | 510 | 1.75 | 18.75 | 6.281 | .89 |
| CUTTING | 6 | Radius & Centered | 28 | 556 | 4.70 | 68.95 | 22.47 | 1.555 |

In the foregoing it is apparent that the radius and centered orifice operates similar to the standard orifice with improved fluid flow properties; however, the metal removal characteristics are almost identical.

It should be understood that the method of the invention is not limited in any way by the particular dimensions of the orifice.

Set forth on Table III are a series of comparative tests showing metal removal using a torch and method of the instant invention and a standard underwater electrode (U.S. Pat. No. 3,835,288) in a standard underwater torch (U.S. Pat. No. 3,751,625) employing the well-known oxy-arc underwater cutting method. The patented electrode is a length of hollow steel tubing having the epoxy coating thereon. As set forth in Table III It is within the scope of this invention to have a plurality of fluid streams directed at the arc to enhance metal removal. It is also within the scope of the invention to completely surround the electrode with the fluid thus causing a cone of water to be directed at the workpiece to enhance removal of molten metal.

Having thus described my invention, what I desire to be secured by Letters Patent of the United States, is set forth in the apended claims.

I claim:

1. A method of removing metal from an object submerged in a liquid medium comprising the steps of:
   establishing an electric arc between an elongated solid electrode and the workpiece thus heating and melting that portion of the object under the arc; and removing the molten metal from the portion of the object being heated by and beneath the arc by directing, from a location spaced from said electrode at least one stream of high pressure liquid to pass between the electrode and the object being heated to impinge upon and carry the molten metal away from the object.

2. A method according to claim 1 wherein the liquid is the medium in which the object is submerged.

3. A method according to claim 1 wherein the liquid is water.

4. A method according to claim 1 wherein the electrode is a solid carbonaceous rod covered with a first thin layer of a conductive material and a second layer of an electrically insulating material covering a substantial portion of the first layer and the electrode.

5. A method according to claim 1 wherein the stream of liquid is directed at the arc from the location at which the electrode is gripped.

6. A method according to claim 1 wherein the arc maintained between the electrode and the object and the stream of liquid are continuously moved along the surface of the object to effect continuous metal removal from the object.

7. A method of grooving, gouging or cutting a metal workpiece submerged underwater comprising the steps of:

positioning a consumable solid elongated electrode held in a suitable gripping device so that a portion of the electrode projects toward the workpiece;

establishing and maintaining an electric-arc between the projecting end of the electrode and the workpiece to melt that portion of the metal under the arc; and directing at least one stream of water under pressure to impinge upon and remove the molten metal from the workpiece beneath the arc.

8. A method according to claim 7 wherein the electrode is a carbonaceous material covered by a thin conductive coating which in turn is covered by an electrically insulating coating, the electrically insulating coating covering the projecting length of the electrode.

9. A method according to claim 7 wherein the water stream is directed toward workpiece from the location at which the electrode is gripped.

10. A method according to claim 7 wherein a plurality of streams are directed at the workpiece.

11. A method according to claim 7 wherein a cone of water surrounding the electrode is directed at the workpiece to remove the molten metal.

12. A consumable-electrode type arc metal removing process using a solid, longitudinally extending electrode, which comprises:

passing an electric current through the work subjected to metal removal and the longitudinally extending electrode serving as the path for electric current for thereby producing a continuous electric arc between the longitudinally extending electrode and the work;

allowing the work to be fused and severed by the arc and, at the same time, projecting a jet of high pressure water from a water projecting nozzle disposed proximate the electrode to the freshly fused point of work, and continuing the arc metal removal while causing the molten metal of the work to be blown away from the attrited edges by the jet of water.

* * * * *